United States Patent Office 3,784,612
Patented Jan. 8, 1974

3,784,612
METHOD FOR THE PREPARATION OF ACETALS AND KETALS OF ALPHA-CHLORINATED ALDEHYDES AND KETONES
Wilhelm Vogt, Cologne-Suelz, and Herman Richtzenhain, Post Marialinden, Germany, assignors to Dynamit Nobel Aktiengesellschaft, Troisdorf, West Germany
No Drawing. Continuation of abandoned application Ser. No. 774,216, Nov. 7, 1968. This application Aug. 5, 1971, Ser. No. 169,494
Claims priority, application Germany, Nov. 11, 1967, P 16 93 017.9
Int. Cl. C07c 43/30
U.S. Cl. 260—615 A        20 Claims

ABSTRACT OF THE DISCLOSURE

Reaction of halogenated olefins of the formula

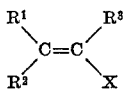

wherein X is chlorine, fluorine or bromine; $R^1$ and $R^2$ are hydrogen, haloalkyl, alkyl alkoxy alkyl or aryl; $R^2$ and $R^1$ are the same or different radicals, and $R^2$ is haloalkyl or alkoxyalkyl with chlorine in the presence of monohydric alcohols to produce α-chlorinated acetals or ketals.

---

This application is a continuation of application S.N. 774,216, filed Nov. 7, 1968, now abandoned.

This invention relates to the production of α-chlorinated acetals and/or ketals.

Acetals and ketals of α-chlorinated aldehydes and ketones can be obtained from their respective aldehydes or ketones, as the case may be, by reaction with alcohols according to methods commonly used for the preparation of acetals and ketals, wherein they are made to react with excess alcohol in the presence of acid catalysts, with the simultaneous azeotropic removal of the water of reaction.

It is furthermore known that acetals of α-chloraldehydes can be prepared from the aldehydes and alcohols in the presence of catalytically active water-soluble salts of Main Groups II and III, and of Sub-Groups II, VI, VII or VIII of the Periodic System, or of ammonium, also with the use of stoichiometric amounts of alcohol.

In all of these methods, the aldehydes or ketones have to be chlorinated in the α position to serve as the starting material, and often such aldehydes or ketones are not easily accessible, and frequently can be handled only with certain special precautions on account of their intense irritant action.

Methods have also been described in which acetals of chloraldehydes are prepared by the chlorination of acetals or of vinyl ethers and vinyl esters. These methods, however, are difficult to apply on an industrial scale.

It has now surprisingly been found that acetals and ketals of α-chlorinated aldehydes and ketones can be prepared in a considerably simpler fashion and from physiologically less hazardous compounds by reacting unsaturated compounds of the general formula

which contain a halogen atom on at least one of the carbon atoms of the double bond and in which $R^1$ and $R^2$ are the same or different and are hydrogen or alkyls which and be substituted by halogen or an alkoxy group, and $R^3$ is haloalkyl or alkoxyalkyl, aryls, and X can be fluorine, chlorine or bromine, with chlorine in the presence of univalent alcohols, preferably in the presence of a hyperstoichiometric amount, that is at least 100% excess, of univalent alcohols of the general formula ROH, wherein R is an alkyl, aralkyl or cycloalkyl radical.

The reaction of unsaturated halogen compounds, in which either fluorine, chlorine or bromine is arranged on the double bond, with chlorine in the presence of a hyperstoichiometric amount of alcohol (i.e., more than 2 moles of alcohol per mole of unsaturated halogen compound) takes place, for example, first with the formation of a 1,2-dichoro-2-alkoxy compound which is not stable in the alcohol to form the 1-chloro-2,2-dialkoxy compound (α-chloraldehyde acetal or α-chloroketone acetal, as the case may be). In these reactions, 1,1,2-trichloro compounds may develop as by-products by the direct addition of chlorine across the unsaturation. The amount of 1,1,2-trichloro by-product depends on the ratio of the alcoholic reactants to the chlorine anions that are formed in the reaction. By the use of a great excess of alcohol or by intercepting the chlorine anions formed in the reaction by means of acid-binding reactants, it is possible to influence the reaction to a great extent in favor of the 1,2-dichloro-2-alkoxy or 1-chloro-2,2-dialkoxy product, as the case may be, and to minimize the amount of 1,1,2-trichloro compound that occurs as a by-product.

The reaction that takes place between the 1,2-dichloro-2-alkoxy compound and the excess alcohol to form the 1-chloro-2,2-dialkoxy compound and HCl is an equilibrium reaction and, by using an excess of alcohol, or by intercepting the HCl, the reaction can be shifted completely to the 1-chloro-2,2-dialkoxy compound.

When unsaturated halogen compounds in which a chlorine atom is located on the double bond are recated with chlorine in alcohol and in the presence of acid-binding reagents, on the one hand the formation of the 1,1,2-trichloro compound that occurs as a by-product is kept low, and at the same time the initially developed 1,2-dichloro-2-alkoxy compound is completely reacted to form the 1-chloro-2,2-dialkoxy compound.

Suitable reactants for the practice of the method of the present invention are unsaturated halogen compounds of the general formula

in which $R^1$, $R^2$ and X have the meaning stated above.

Examples of unsaturated halogen compounds of the above general formula are the following:

1-chloropropene-(1),
2-chloropropene-(1),
1,3-dichloropropene-(1),
1-chloro-3-methoxypropene-(1),
1-chloro-3-ethoxypropene-(1),
2-chloro-3-methoxypropene-(1),
2,3-dichloro-propene-(1),
1-bromopropene-(1),
2-bromopropene-(1),
3-chloro-2-bromopropene-(1),
1-chloro-3-bromoproprene-(1),
1,3-dibromopropene-(1),
2,3-dibromopropene-(1),
2-chloro-3-ethoxypropene-(1),
2-fluorobutene-(1),
1-chlorobutene-(1),
2-chlorobutene-(1),
1,3-dichlorobutene-(1),
2,3-dichlorobutene-(1),
2,3,4-trichlorobutene-(1),
1,3,4,4-tetrachlorobutene-(1),
1-bromobutene-(1),
2,3-dibromobutene-(1), 1-chloro-3,4-dibromobutene-(1),
2-chlorobutene-(2),
1,2-dichlorobutene-(2),
1,3-dichlorobutene-(2),
1,2,4-trichlorobutene-(2),
2-bromobutene-(2),
1,3-dibromobutene-(2),
2-chloro-1,4-dibromobutene-(2),
1,2,4-tribromobutene-(2),
1-chloro-2-methylpropene-(1),
1-bromo-2-methylpropene(1),
1,3-dibromo-2-methylpropene-(1),
2-chloro-4-methoxybutene-(1),
1-chloropentene-(1),
2-chloropentene-(1),
1-bromopentene-(1),
2-chloropentene-(2),
3-chloropentene-(2),
2,5-dichloropentene-(2),
2-bromopentene-(2),
3-bromopentene-(2),
1-cholro-2-methylbutene-(1),
3-chloro-2-methylbutene-(2),
1,3-dichloro-2-methylbutene-(2),
3,4-dichloro-2-methylbutene-(2),
3-bromo-2-methylbutene-(2),
3,4-dichloro-2-methylbutene-(2),
3-bromo-2-methylbutene-(2),
2-chlorohexene-(1),
1-chlorohexene-(1),
1-chloro-1-phenylethylene,
2-chloro-1-phenyl-ethylene,
1-bromo-1-phenylethylene, and
2-bromo-1-phenyl-ethylene.

The reaction between chlorine and unsaturated halogen compounds in which fluorine, chlorine or bromine is on the double bond can be performed in univalent alcohols of the general formula ROH, in which R can represent an alkyl, aralkyl or cycloalkyl, radical which may be chlorosubstituted or alkoxy-substituted, if desired. Prefered alcohols are the primary alcohols, since the reaction takes place with greater speed in them than it does in secondary or tertiary alcohols. Suitable primary alcohols are mainly those having alkyl radicals of up to 4 carbon atoms in the chain, such as methanol, ethanol, n-propanol and n-butanol. The hydroxides, oxides, carbonates and alcoholates of the metals of Main Groups I and II, ammonia, and aliphatic compounds having one or more 1,2-epoxy groups, can be used as acid-binding reagents for the shifting of the reaction equilibrium. Basic ion exchanges can also be used as acid-binding agents.

The method of the present invention can be practiced with the addition of acid-binding reagents on the order of the hydroxides, oxides, carbonates and alcoholates of metals of Main Groups I and II of the Periodic Table. Particularly suitable are the hydroxides, oxides, carbonates and alcoholates of potassium, sodium, magnesium and calcium. The hydroxides, oxides, carbonates and alcoholates of the rarer alkali or alkaline earth metals can, of course, also be used successfully, since they can be recovered again as halides. The compounds named are used preferably in stoichiometric amounts, although they can also be used in a smaller quantity than that called for by the stoichiometric ratio. The use of alkali metal compounds as acid binding reagents is particularly advantageous because the resulting alkali chlorides are difficulty soluble in the reaction medium. The solubility of sodium chloride in methanol at 20° C. is less than 1.5% by weight. Due to their poor solubility, the compounds are also easy to remove from the reaction mixture.

The acid binding reagents can also be aliphatic compounds having one or more 1,2-epoxide groups, i.e., aliphatic 1,2-epoxides of the monoepoxide type, as well as polyepoxides. Suitable monoepoxides are the epoxidized compounds of mono-unsaturated hydrocarbons (ethylene, propylene, butylene, cyclohexane), halogen-containing epoxides (epichlorhydrin) and glycide ethers of univalent alcohols (methyl, ethyl, n- and i-propyl, n-, i- and tert. butyl, 2-ethyl hexyl and dodecyl alcohol, etc.). Examples of suitable polyepoxides are: epoxides of poly-unsaturated hydrocarbons (vinylcyclohexene, dicyclopentadiene, cyclo-hexadiene, cyclododecatriene, butadienes) and glycidyl ethers of polyvalent alcohols (ethylene, propylene and butylene glycols, polyglycols, thiodiglycols, glycerin, etc.). The aliphatic 1,2-epoxides are used preferably in stoichiometric quantities, i.e., 1 mole of monoepoxide per mole of chlorine, 0.5 mole of diepoxide per mole of chlorine, etc. However, they can also be used in excess without affecting the yield. A slight excess (2–5%) above the stoichiometric ratio has proven advantageous.

The selection of the acid binding reagent is governed by the hydrolysis stability of the $\alpha$-halogen aldehyde acetals or ketone acetals that develop. In the case of the preparation of $\alpha$-chloroacetaldehydedimethylacetal by chloralkoxylation from vinyl chloride with chlorine in methanolic solution, or of 1,3-dichloroacetonedimethylketal by the chloralkoxylation of 2,3 - dichloropropene-(1) with chlorine in methanolic solution, it is entirely possible to use as acid binding reagents those which form water in the neutralization. In the preparation of 1-chloroacetonedimethylketal by the chloroalkoxylation of 2-chloropropene-(1) with chlorine in methanol, however, only alkali alcoholates, dry basic ion exchangers or 1,2-epoxides can be used as the acid binding reagents, because otherwise the 1-chloroacetonedimethylketal that develops is immediately hydrolyzed to 1-chloroacetone.

The acid binding agents used to neutralize the acid that develops in the reaction can be used either in solid form, in solution, or in suspension.

The separation of the trichloro compound that occurs as a by-product from the chlorodialkoxy compound becomes especially difficult when alcohols having 1 to 3 carbon atoms are used for the reaction of the chlorolefins. In these cases the molecular weights of the principal products and by-products are quite similar, and the differences in the boiling points of the compounds are very slight, so that distillative separation becomes difficult.

The chlorodialkoxy compounds and trihalogen compounds that develop when the unsaturated halogen compounds are reacted with chlorine in the presence of alcohol are characterized by a difference in the reactivity of the halogen atoms. These differences in the reactivity of the halogen atoms of the two compounds can be exploited for the separation of these compounds and the purification of the $\alpha$-chloroacetals or $\alpha$-chloroketals.

A dialkoxy compound that is free of trichloro compounds is obtained by treating the mixture of chloroacetals or chloroketals and the corresponding trihalogen compound that develops in the reaction with a quantity of an alkaline substance that is at least stoichiometric with the trihalogen compound, at temperatures between 10 and 100° C., preefrably between 40° and 80° C., and then separating and purifying the resultant mixture in a conventional manner. This procedure greatly facilitates the production of the desired chlorodialkoxy compound in pure form. Whereas the trihalogen compound can react even under these relatively mild conditions with alkaline substances to produce a vinylidene halide compound plus a halogen hydride, the chlorodialkoxy compound remains virtually unaffected under the said conditions.

In this manner it is possible, for example, to treat with alkali a mixture consisting of 30 wt. percent of 1,1,2-trichloroethane (B.P. 113° C.) and 70 wt. percent of chloroacetaldehydedimethylacetal (B.P. 128° C.), thereby transforming all of the 1,1,2-trichloroethane to vinylidene chloride, which is then quite easy to separate from the chloroacetaldehydedimethylacetal on account of the greater difference in boiling point. In this method of separating and purifying the chloralkoxylation mixture, the vinylidene halides that are produced are valuable byproducts.

The transformation of the trihalogen compound to the vinylidene halide compound can be performed with alkali hydroxides and alkaline earth hydroxides in an aqueous and/or alcoholic solution or suspension, or with alkali alcoholates in solid form or dissolved in alcohols.

The quantity of the alkaline substances required for the reaction is governed by the amount of the trihalogen compound present in the mixture to be separated. For the complete reaction of the trihalogen compound an at least stoichiometric amount of the alkaline substance is needed, i.e. for each mole of trihalogen compound, one equivalent of a basic alkali or alkaline earth compound is necessary. A slight excess (about 1–5%) above the stoichiometric ratio has proven advantageous.

The process can be performed either continuously or discontinuously (batchwise).

The process can be performed either at normal pressure or at reduced or elevated pressure.

The separation of the mixture after the treatment with alkaline substances can be performed by conventional methods. The type of procedure to be used is governed on the one hand by the resulting mixture of chloroacetal or chloroketal and the vinylidene halide compound, and on the other hand by the alkaline substance used and the way in which it was used, i.e., according to whether it was added in the form of an aqueous or alcoholic solution or in solid form. One method of separation, for instance, can consist in immediately drawing the vinylidene halide compound off from the head of the column while it is being evolved. If the alkaline substance is used in solid form, it may be advantageous, depending on the case, to filter out the alkali or alkaline earth chloride prior to the distillative separation of the mixture.

The reaction between chlorine and unsaturated halogen compounds having a halogen atom on the double bond takes place in the alcoholic solution at temperatures between $-20°$ C. and $100°$ C., and more advantageously at temperatures between $0°$ C. and $30°$ C.

The speed of the reaction depends on the constitution of the unsaturated halogen compound, on its concentration in the reaction mixture, and on the apparatus used in performing the reaction. To prevent a momentary overconcentration, it is desirable to feed the chlorine into the reaction mixture, controlling the rate of introduction advantageously in such a manner that it corresponds approximately to the rate at which the reaction mixture absorbs the chlorine. For the achievement of the highest possible yields, the unsaturated halogen compound is reacted with chlorine advantageously in a molar ratio of 1:1.

The process according to the present invention can be performed both at normal pressure and at reduced or elevated pressure.

Low-boiling, unsaturated halogen compounds are best reacted under pressure, i.e., a pressure is used, at which the unsaturated compound is in liquid form under the conditions of the reaction.

The reaction of the unsaturated halogen compounds with chlorine in an alcoholic solution is performed by introducing the chlorine and the unsaturated halogen compound continuously into the alocholic reaction medium— preferably separately—in the same molar ratio. The addition of the acid binding reagent can also be performed continuously. The neutralization of the reaction solution, however, can also be performed after the reaction has ended. The alcoholic reaction component is used generally in a 3- to 30-fold molar excess. In the case of continuous neutralization with basic agents which do not form water in the neutralization, it is advantageous to use a slight molar excess of the alcoholic reaction component.

The α-chlorinated acetals and ketals prepared by this process can be used as aids in the cellulose industry, as insecticides, and as valuable intermediates for the manufacture of a number of products.

The process of the present invention is illustrated by the following examples:

EXAMPLE 1

76.5 g. of 2-chloropropene-(1) (1 mole was dissolved in 320 g. of methanol (10 moles). 1 mole of chlorine was introduced into this reaction solution at a rate of 6.5 l./h. (molar ratio chlorine to methanol 1:10). The reaction temperature was maintained during this period at 0 to 5° C. After the reaction ended, the mixture was neutralized with sodium methylate and the sodium chloride was removed by filtration. Analysis by gas chromatography showed, for a 2-chloropropene transformation of 85%, a chlorination product consisting of 77.8 wt. percent chloracetonedimethylketal and 22.2 wt. percent of 1,2,2-trichloropropene.

EXAMPLE 2

111 g. of 2,3-dichloropropene-(1) (1 mole) was dissolved in 320 g. of methanol (10 moles). 1 mole of chlorine was introduced into this reaction solution at a rate of 11.2 l./h. (molar ratio chlorine to methanol 1:10), and at a reaction temperature of 0–5° C. After the reaction had ended, the precipitated reaction product was separated by filtration. 61 g. of 1,3 dichloroacetonedimethylacetal was isolated. The filtered solution was neutralized with sodium methylate and filtered free of sodium chloride. Analysis by gas chromatography indicated another 39.7 g. of 1,3-dichloroacetone dimethylketal plus 49 g. of 1,2,2,2-tetrachloropropane in the filtrate.

EXAMPLE 3

106.5 g. of 1-chloro-3-methoxypropene-(1) (1 mole) was dissolved in 320 g. of methanol (10 moles). 1 mole of chlorine was introduced into this reaction solution at a rate of 11.2 l./h. (molar ratio chlorine to methanol 1:10) at a reaction temperature of 0–5° C. After the reaction had ended, the mixture was neutralized with sodium methylate and filtered free of precipitated sodium chloride. Gas chromatography showed a chlorination product consisting of 80% by weight of 1,1,3-trimethoxy-2-chloropropane and 20 wt. percent of 1,1,2-trichloro-3-methoxypropane.

The separation of the dialkoxy compounds from the trichloro compounds is illustrated by the following examples:

EXAMPLE 4

65 g. of a solution of 20.6 wt. percent sodium methylate in methanol was added to a mixture of 70 g. of chloroacetaldehydedimethylacetal, 30 g. of 1,1,2-trichloroethane and 40 ml. of methanol, and the mixture was heated for 3 hours at 60° C. with intense agitation. The vinylidene chloride that formed was removed continuously through a column during this period. The reaction solution was filtrated and then fractionated. Chloroacetaldehydedimethylacetal was obtained in a purity of 99.8% in a 95% yield.

EXAMPLE 5

(Purification of the product obtained according to Example 3.)

67 g. of a solution of 21 wt. percent sodium methylate in methanol was added to a mixture of 41.5 g. of 1,1,2-trichloro-3-methoxypropane and 119.5 g. of 1,1,3-trimethoxy-2-chloropropane and the mixture was heated for 5 hours with intense stirring. The mixture was filtered free of precipitated sodium chloride and the reaction solution was distilled. Examination by gas chromatography showed a complete transformation of the 1,1,2-trichloro-3-methoxypropane to 1,1-dichloro - 3 - methoxypropene-(1). Fractional distillation then yielded 1,1,3 - trimethoxy-2-chloropropane in a purity of 99%.

What is claimed is:

1. Process which comprises reacting a member selected from the group consisting of 2-chloropropene-1 and 2,3-dichloropropene-1 with chlorine in the presence of at least one monoalkanol to form the corresponding ketal.

2. Process as claimed in claim 1, carried out at a temperature of about —20 to 100° C.

3. Process as claimed in claim 1, carried out in the presence of a hyperstoichiometric quantity of said monoalkanol.

4. Process as claimed in claim 1, carried out at 0 to 30° C.

5. Process as claimed in claim 1, wherein the mol ratio of chlorine to halogenated olefin is about 1:1.

6. Process as claimed in claim 1, including treating the reaction product with at least one acid binding reagent.

7. Process as claimed in claim 6, wherein said acid binding reagent is at least one member of the group consisting of hydroxides, oxides, carbonates and alcoholates of at least one metal of Groups I–A and II–A of the Periodic System.

8. Process as claimed in claim 6, wherein said acid binding reagent is at least one epoxide containing aliphatic compound.

9. Process as claimed in claim 1, wherein the reaction product together with a corresponding trihalogenated by-product are treated with an alkaline agent in a quantity at least stoichiometric with respect to said trihalogenated compound at a temperature of about 10 to 100° C., and then resolving the resulting mixture.

10. Process as claimed in claim 9, wherein said treatment is carried out at about 40 to 80° C.

11. Process which comprises reacting 1-chloro-3-methoxy propene-1 with chlorine in the presence of at least one monoalkanol to form the corresponding acetal.

12. Process as claimed in claim 11, carried out at a temperature of about —20 to 100° C.

13. Process as claimed in claim 11, carried out in the presence of a hyperstoichiometric quantity of said monoalkanol.

14. Process as claimed in claim 11, carried out at 0 to 30° C.

15. Process as claimed in claim 11, wherein the mol ratio of chlorine to halogenated olefin is about 1:1.

16. Process as claimed in claim 11, including treating the reaction product with at least one acid binding reagent.

17. Process as claimed in claim 16, wherein said acid binding reagent is at least one member of the group consisting of hydroxides, oxides, carbonates and alcoholates of at least one metal of Groups I–A and II–A of the Periodic Systems.

18. Process as claimed in claim 16, wherein said acid binding reagent is at least one epoxide containing aliphatic compound.

19. Process as claimed in claim 11, wherein the reaction product together with a corresponding trihalogenated by-product are treated with an alkaline agent in a quantity at least stoichiometric with respect to said trihalogenated compound at a temperature of about 10 to 100° C., and then resolving the resulting mixture.

20. Process as claimed in claim 19, wherein said treatment is carried out at about 40 to 80° C.

References Cited

UNITED STATES PATENTS

| | | | |
|---|---|---|---|
| 2,247,482 | 7/1941 | Dickey et al. | 260—615 |
| 2,481,157 | 9/1949 | Schmerling | 260—615 |
| 2,550,637 | 4/1951 | Cophenhaver | 260—615 |
| 2,803,668 | 8/1957 | Morris et al. | 260—615 |

FOREIGN PATENTS

| | | | |
|---|---|---|---|
| 249,039 | 3/1926 | Great Britain | 260—615 |

OTHER REFERENCES

Karrer, Organic Chemistry (1946), p. 231.

BERNARD HELFIN, Primary Examiner

U.S. Cl. X.R.

260—611 A, 611 R

UNITED STATES PATENT OFFICE
CERTIFICATE OF CORRECTION

Patent No. 3,784,612  Dated January 8, 1974

Inventor(s) WILHLEM VOGT and HERMAN RICHTZENHAIN

It is certified that error appears in the above-identified patent and that said Letters Patent are hereby corrected as shown below:

Column 1, line 68, "and" (first occurrence) should read -- can --

Column 2, line 32, "recated" should read -- reacted --.
Column 3, line 21, "1-cholro" should read -- 1-chloro --;
    lines 67 - 68, "difficulty" should read -- difficultly --.
Column 4, line 59, "preefrably" should read -- preferably --.
Column 6, line 32, "1,2,2,2" should read -- 1,2,2,3 --.

Signed and sealed this 29th day of October 1974.

(SEAL)
Attest:

McCOY M. GIBSON JR.
Attesting Officer

C. MARSHALL DANN
Commissioner of Patents